US010573900B2

(12) United States Patent
Ogasawara et al.

(10) Patent No.: US 10,573,900 B2
(45) Date of Patent: Feb. 25, 2020

(54) SUCTION ROLLER, COATING APPARATUS AND APPARATUS FOR MANUFACTURING MEMBRANE ELECTRODE ASSEMBLY

(71) Applicant: SCREEN Holdings Co., Ltd., Kyoto (JP)

(72) Inventors: Mitsuo Ogasawara, Kyoto (JP); Yoshinori Takagi, Kyoto (JP); Masafumi Omori, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 70 days.

(21) Appl. No.: 15/674,090

(22) Filed: Aug. 10, 2017

(65) Prior Publication Data
US 2018/0053946 A1 Feb. 22, 2018

(30) Foreign Application Priority Data

Aug. 19, 2016 (JP) .................. 2016-160951

(51) Int. Cl.
| | |
|---|---|
| H01M 4/88 | (2006.01) |
| B32B 37/00 | (2006.01) |
| B32B 38/00 | (2006.01) |
| H01M 8/1004 | (2016.01) |
| B29D 99/00 | (2010.01) |
| B65H 27/00 | (2006.01) |
| H01M 4/04 | (2006.01) |
| H01M 8/1018 | (2016.01) |

(52) U.S. Cl.
CPC .......... *H01M 4/881* (2013.01); *B29D 99/005* (2013.01); *B32B 37/0053* (2013.01); *B32B 38/00* (2013.01); *B65H 27/00* (2013.01); *H01M 4/8807* (2013.01); *H01M 4/8828* (2013.01); *H01M 4/8882* (2013.01); *H01M 8/1004* (2013.01); *B65H 2406/33* (2013.01); *H01M 4/0404* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 4,551,205 A | * | 11/1985 | Laapotti | ............... D21F 3/04 |
| | | | | 162/305 |
| 2007/0190253 A1 | * | 8/2007 | Matsunaga | ......... H01M 4/8828 |
| | | | | 427/282 |

FOREIGN PATENT DOCUMENTS

| | | |
|---|---|---|
| CN | 201768654 U | 3/2011 |
| CN | 102371232 A | 3/2012 |

(Continued)

*Primary Examiner* — Jethro M. Pence
(74) *Attorney, Agent, or Firm* — Ostrolenk Faber LLP

(57) ABSTRACT

An orifice plate having orifice openings is interposed between a roller body and a side plate. In a closed region of an outer peripheral surface of the roller body which is covered with a base material, the base material is held on the outer peripheral surface of the roller body under suction by a negative pressure developed in suction holes. In an open region of the outer peripheral surface which is not covered with the base material, the sucking of a gas from an exterior space into the roller body is suppressed because it is difficult for the gas to pass through the orifice openings. This suppresses a reduction in sucking force in the closed region due to the entry of the gas from the open region. The roller body, the orifice plate and the side plate rotate as a unit. This suppresses deterioration of the members due to the slidable movement thereof.

11 Claims, 5 Drawing Sheets

(56) References Cited

FOREIGN PATENT DOCUMENTS

| | | |
|---|---|---|
| CN | 102825893 A | 12/2012 |
| CN | 202829072 U | 3/2013 |
| CN | 203591917 U | 5/2014 |
| CN | 204412576 U | 6/2015 |
| CN | 205008179 U | 2/2016 |
| CN | 205240859 U | 5/2016 |
| CN | 205467869 U | 8/2016 |
| JP | 2001-070863 A | 3/2001 |
| JP | 2003-312909 A | 11/2003 |
| JP | 2007-099400 A | 4/2007 |
| JP | 2014-234541 A | 12/2014 |
| JP | 2016-117588 A | 6/2016 |

\* cited by examiner

SUCTION ROLLER, COATING APPARATUS AND APPARATUS FOR MANUFACTURING MEMBRANE ELECTRODE ASSEMBLY

BACKGROUND OF THE INVENTION

Field of the Invention

The present invention relates to a suction roller rotating while holding a strip-shaped base material on part of an outer peripheral surface thereof under suction, and a coating apparatus and a membrane electrode assembly manufacturing apparatus both including the suction roller.

Description of the Background Art

In recent years, attention has been given to fuel cells as power sources for driving motor vehicles, mobile phones or the like. A fuel cell is a power generation system that generates electric power through an electrochemical reaction between hydrogen ($H_2$) contained in a fuel and oxygen ($O_2$) in the air. The fuel cell has advantages over other cells in its high power generation efficiency and low environmental load.

There are several types of fuel cells that are different depending on electrolytes being used therein. One of these fuel cells is a polymer electrolyte fuel cell (PEFC) including an ion exchange membrane (electrolyte membrane) used as the electrolyte. Polymer electrolyte fuel cells, which are capable of operating at room temperature and can be reduced in size and weight, are expected to be applied to motor vehicles or portable devices.

In general, the polymer electrolyte fuel cells have a structure such that multiple cells are stacked one on top of another. One cell is comprised of a membrane electrode assembly (MEA) and a pair of separators provided on opposite sides of the membrane electrode assembly to sandwich the membrane electrode assembly therebetween. The membrane electrode assembly includes an electrolyte membrane and a pair of electrode layers formed on opposite surfaces of the electrolyte membrane. One of the two electrode layers is an anode electrode, and the other thereof is a cathode electrode. When a fuel gas containing hydrogen comes in contact with the anode electrode and air comes in contact with the cathode electrode, electric power is generated through an electrochemical reaction.

During the manufacture of the aforementioned membrane electrode assembly, the electrolyte membrane that is a strip-shaped base material is held under suction on an outer peripheral surface of a suction roller having a plurality of suction holes. Then, a catalyst ink (electrode paste) obtained by dispersing catalyst particles containing platinum (Pt) in a solvent such as alcohol is applied to a surface of the electrolyte membrane held on the suction roller. Thereafter, the catalyst ink is dried, so that an electrode layer is formed.

A conventional apparatus that transports a strip-shaped base material while holding the base material on an outer peripheral surface of a roller is disclosed, for example, in Japanese Patent Application Laid-Open No. 2014-234541.

When a suction roller is used to transport the base material, the base material comes in contact with part of the outer peripheral surface of the suction roller. This produces a closed region covered with the base material and an open region not covered with the base material on the outer peripheral surface of the suction roller. In the open region, a gas from an exterior space enters the interior of the suction roller through the suction holes. There is a problem such that the entry of the gas from the open region reduces the force of suction of the base material in the closed region.

Japanese Patent Application Laid-Open No. 2014-234541 discloses a structure of a roller including a rotary ring unit and a fixed ring unit which slidably move relative to each other. In the roller disclosed in Japanese Patent Application Laid-Open No. 2014-234541, the sliding surfaces of the rotary ring unit and the fixed ring unit have openings provided only in an angular range within which the base material is wound thereon. The use of such a structure for the suction roller allows the force of suction to be produced only in the closed region, thereby preventing the entry of the gas from the open region.

However, an attempt to transmit a sucking force inside the two rotating members while slidably moving the two rotating members relative to each other involves the need to provide a sealing member between the two rotating members. The sealing member, which suffers deterioration caused by the slidable movement, needs replacement at regular time intervals. Also, strong sliding resistance is developed between the two rotating members. Thus, a driving force stronger than the sliding resistance is required for the rotation of the suction roller.

SUMMARY OF THE INVENTION

In view of the foregoing, it is therefore an object of the present invention to provide a structure capable of suppressing a reduction in sucking force in a closed region of an outer peripheral surface of a suction roller due to a gas entering from an open region of the outer peripheral surface and capable of suppressing deterioration of members due to the slidable movement thereof.

To solve the aforementioned problem, the present invention is intended for a suction roller rotating while holding a strip-shaped base material on part of an outer peripheral surface thereof under suction. The suction roller comprises: a cylindrical roller body having the outer peripheral surface and an axis; an orifice plate fixed to an end surface of the roller body as seen in a direction of the axis; and a side plate fixed to a surface on the opposite side of the orifice plate from the roller body, the roller body including a plurality of suction holes provided in the outer peripheral surface, and at least one interior flow passage provided inside the outer peripheral surface and in communication with the suction holes, the orifice plate including at least one orifice opening in communication with the at least one interior flow passage, the side plate including an exhaust flow passage in communication with the at least one orifice opening, the at least one orifice opening being smaller than the at least one interior flow passage and the exhaust flow passage as seen in the direction of the axis.

According to the present invention, in the closed region of the outer peripheral surface of the roller body which is covered with the base material, the base material is held on the outer peripheral surface of the roller body under suction by a negative pressure developed in the suction holes. In the open region of the outer peripheral surface which is not covered with the base material, the sucking of a gas from an exterior space into the roller body is suppressed because it is difficult for the gas to pass through the orifice opening. This suppresses a reduction in sucking force in the closed region due to the entry of the gas from the open region. The roller body, the orifice plate and the side plate rotate as a unit. This suppresses deterioration of the members due to the slidable movement thereof.

DESCRIPTION OF THE PREFERRED EMBODIMENTS

Figure 1:
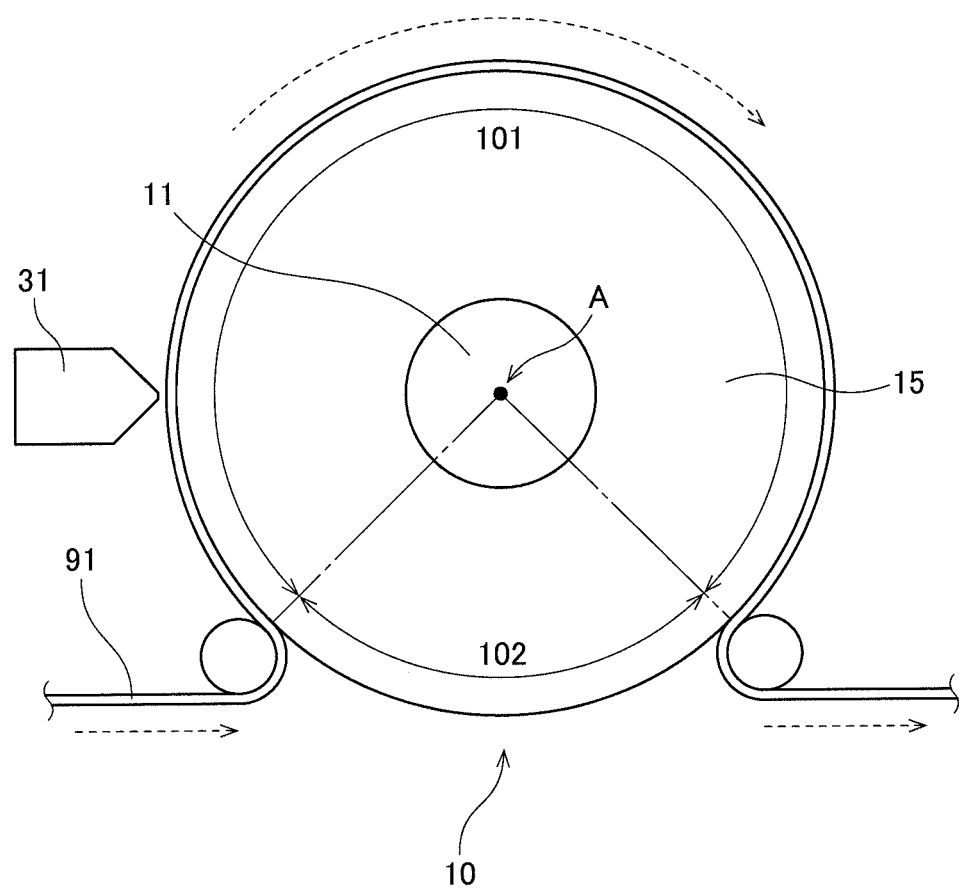
FIG. 1 is a side view of a suction roller.
Figure 2:
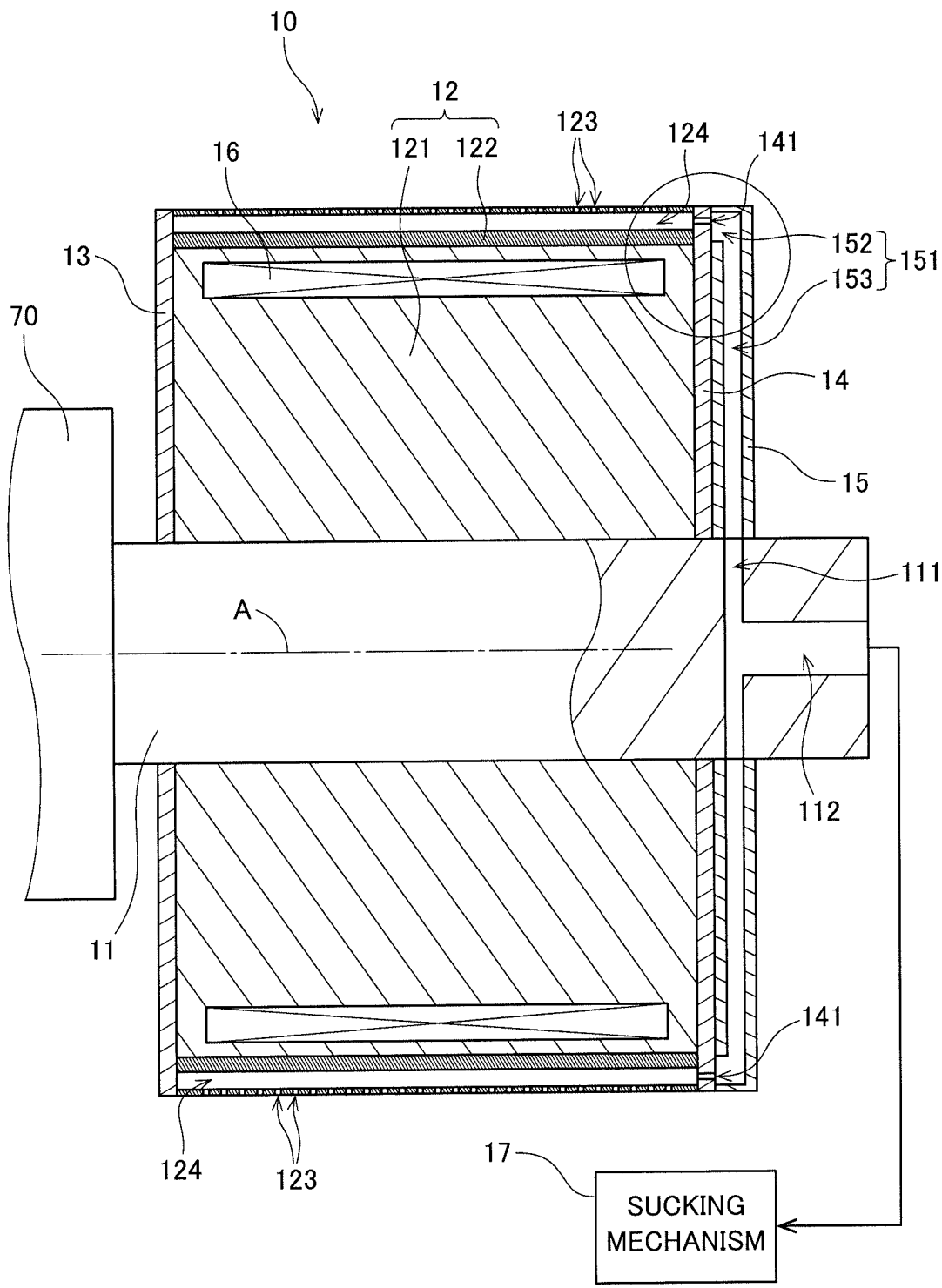
FIG. 2 is a sectional view of the suction roller.

A preferred embodiment according to the present invention will now be described with reference to the drawings.
<1. Configuration of Suction Roller>
FIG. 1 is a side view of a suction roller 10 as seen in the direction of an axis A according to one preferred embodiment of the present invention. FIG. 2 is a sectional view of the suction roller 10 taken along a plane containing the axis A. This suction roller 10 is a roller that transports an elongated strip-shaped base material 91 by rotating about the axis A extending in a horizontal direction while holding the base material 91 thereon under suction. Specific examples of the base material 91 will be described later. The suction roller 10 has a cylindrical outer peripheral surface with a plurality of suction holes 123. When a manufacturing apparatus is in operation, a negative pressure (vacuum) is developed in the plurality of suction holes 123 by a sucking mechanism 17 conceptually shown in FIG. 2. The strip-shaped base material 91 is held on part of the outer peripheral surface of the suction roller 10 under suction by the negative pressure. The suction roller 10 has a diameter in the range of 30 to 1600 mm, for example.

As shown in FIGS. 1 and 2, the suction roller 10 includes a shaft 11, a roller body 12, a first side plate 13, an orifice plate 14, a second side plate 15 and a heating mechanism 16.

The shaft 11 is a generally cylindrical member extending horizontally along the axis A. For example, metal such as stainless steel or iron is used as the material of the shaft 11. The shaft 11 is rotatably supported by a bearing not shown. The shaft 11 has a first end portion connected to a motor 70 serving as a driving source. When the motor 70 is driven, the shaft 11 rotates about the axis A.

As shown in FIG. 2, a plurality of connecting flow passages 111 and one central flow passage 112 are provided inside the shaft 11. The central flow passage 112 extends along the axis A in the center of the shaft 11. The connecting flow passages 111 are in communication with the central flow passage 112 and an exhaust flow passage 151 in the second side plate 15 to be described later. The central flow passage 112 is connected to the sucking mechanism 17. For example, an exhaust pump is used as the sucking mechanism 17.

The roller body 12 rotates around the shaft 11 while holding the base material 91 thereon under suction. The roller body 12 according to the present preferred embodiment includes an inner cylindrical member 121 and an outer cylindrical member 122, and is in a cylindrical form as a whole. The inner cylindrical member 121 is a cylindrical member fixed to an outer peripheral surface of the shaft 11. The outer cylindrical member 122 is a cylindrical member fixed to an outer peripheral surface of the inner cylindrical member 121. An outer peripheral surface of the outer cylindrical member 122 serves as an outer peripheral surface of the roller body 12. For example, metal such as stainless steel is used as the material of the inner cylindrical member 121 and the outer cylindrical member 122.

Figure 3:
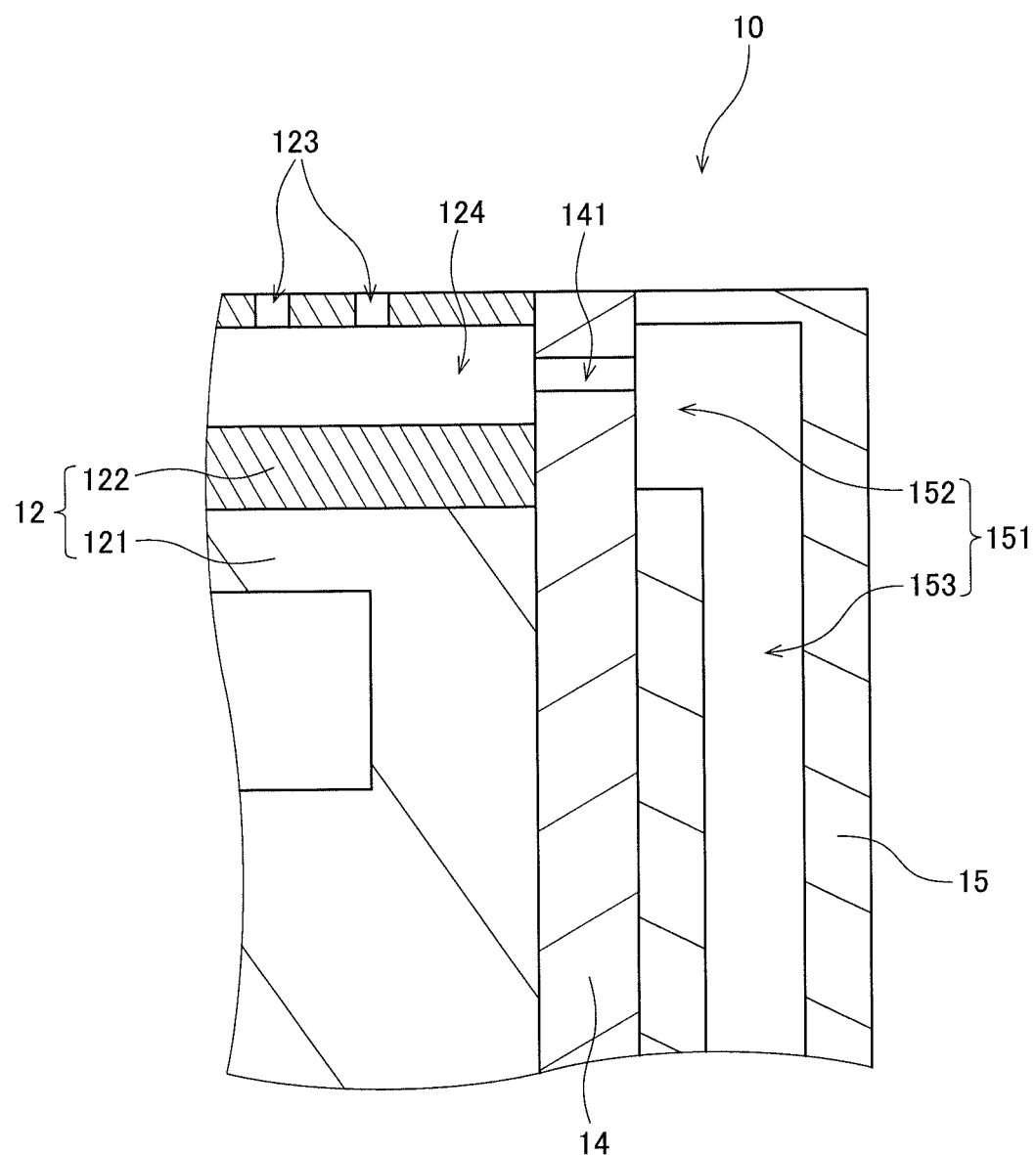
FIG. 3 is a partial sectional view of the suction roller.

FIG. 3 is a partial sectional view of the suction roller 10 in an encircled region shown in FIG. 2. As shown in FIGS. 2 and 3, the outer cylindrical member 122 has the plurality of suction holes 123 and a plurality of interior flow passages 124. The suction holes 123 are distributed in regularly spaced-apart relation in the outer peripheral surface of the outer cylindrical member 122. Each of the suction holes 123 has an opening diameter of not greater than 2 mm, for example. The interior flow passages 124 are provided inside the outer peripheral surface of the outer cylindrical member 122. The interior flow passages 124 are arranged in equally spaced-apart relation in a circumferential direction with respect to the axis A. Each of the interior flow passages 124 extends in a direction (referred to hereinafter as an "axial direction") parallel to the axis A between a first end and a second end of the outer cylindrical member 122. The suction holes 123 provide communication between the space outside the outer cylindrical member 122 and the interior flow passages 124.

The first side plate 13 is a disk-shaped member fixed to a first end surface of the roller body 12 as seen in the axial direction. For example, metal such as stainless steel or iron is used as the material of the first side plate 13. The first side plate 13 is fixed to the inner cylindrical member 121 and the outer cylindrical member 122 with bolts, for example. Openings at first ends of the respective interior flow passages 124 in the outer cylindrical member 122 are blocked by the first side plate 13.

Figure 4:
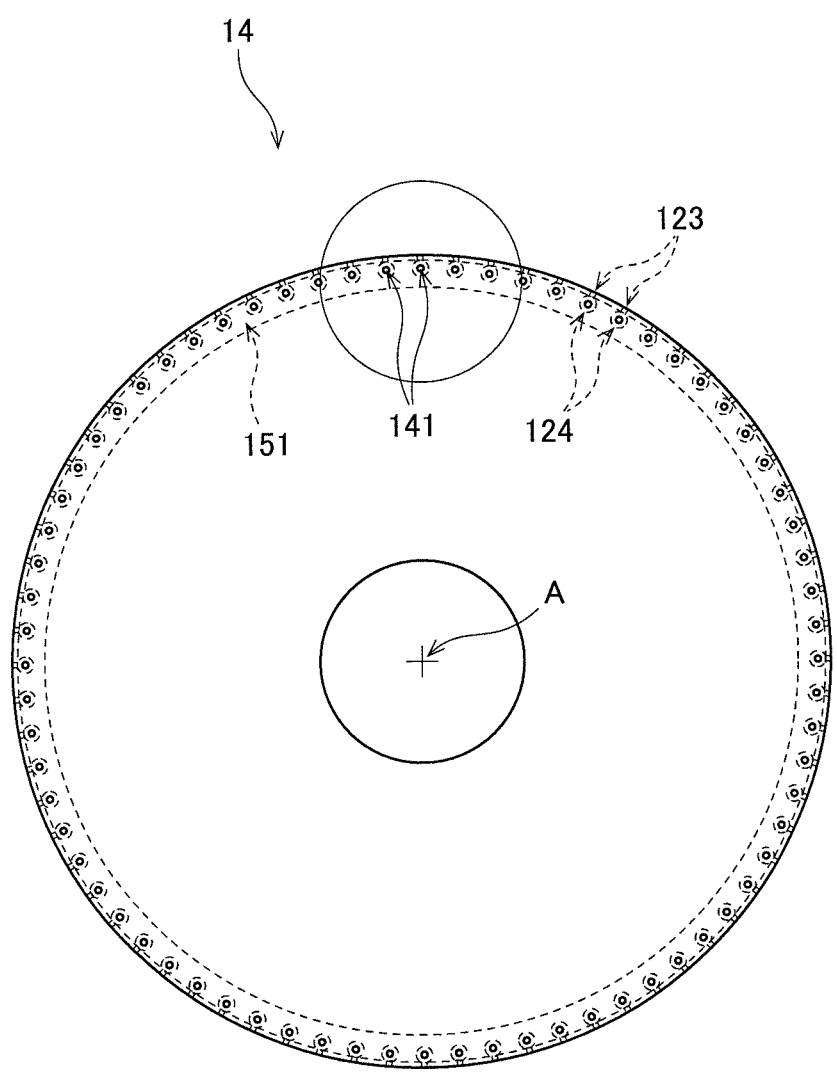
FIG. 4 is a plan view of an orifice plate.
Figure 5:
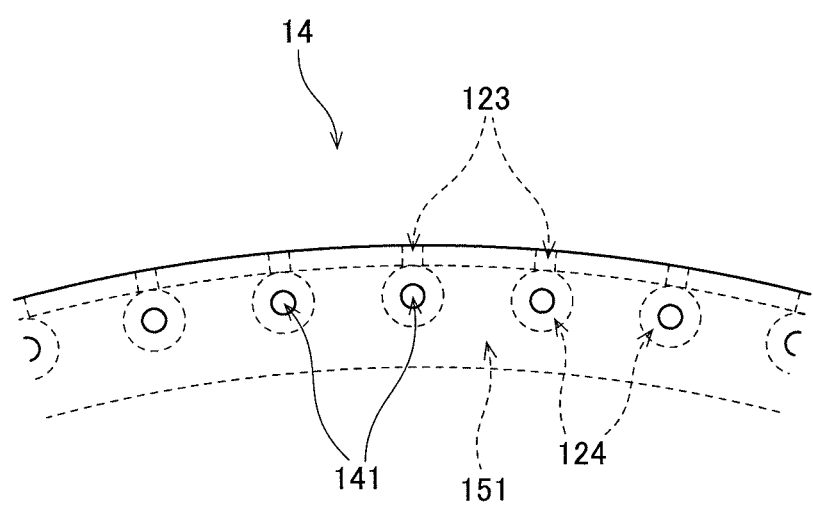
FIG. 5 is a partial plan view of the orifice plate.

The orifice plate 14 is a disk-shaped member fixed to a second end surface of the roller body 12 as seen in the axial direction. The material of the orifice plate 14 may be metal such as stainless steel or iron, or resin. FIG. 4 is a plan view of the orifice plate 14 as seen in the axial direction. FIG. 5 is a partial plan view of the orifice plate 14 in an encircled region shown in FIG. 4. In FIGS. 4 and 5, the suction holes 123 and the interior flow passages 124 in the roller body 12 and the exhaust flow passage 151 in the second side plate 15 to be described later are indicated by broken lines.

As shown in FIGS. 2 to 5, the orifice plate 14 has a plurality of orifice openings 141. The orifice openings 141 are through holes smaller in opening area than the interior flow passages 124 and the exhaust flow passage 151 to be described later as seen in the axial direction. The orifice openings 141 are arranged in equally spaced-apart relation in a circumferential direction with respect to the axis A. As shown in FIG. 5, the orifice openings 141 are positioned in superposed relation with the respective interior flow passages 124. That is, the interior flow passages 124 are in a one-to-one correspondence with the orifice openings 141. The orifice openings 141 are in communication with the respective interior flow passages 124.

The second side plate 15 is a disk-shaped member fixed to a surface on the opposite side of the orifice plate 14 from the roller body 12. For example, metal such as stainless steel or iron is used as the material of the second side plate 15. As shown in FIGS. 2 to 5, the exhaust flow passage 151 is provided inside the second side plate 15. The exhaust flow passage 151 includes an annular outside flow passage 152 and a plurality of inside flow passages 153 extending from the outside flow passage 152 toward the shaft 11. The outside flow passage 152 is in communication with the orifice openings 141. The inside flow passages 153 are in communication with the central flow passage 112 through the connecting flow passages 111 in the shaft 11.

The heating mechanism 16 is a mechanism for heating the outer peripheral surface of the roller body 12. The heating mechanism 16 is provided inside the interior flow passages 124 in the roller body 12. For example, a mechanism for circulating a heated heat medium (e.g., water) through pipe lines provided inside the inner cylindrical member 121 is used as the heating mechanism 16. However, the heating mechanism 16 may be an electrothermal heater that generates heat when energized. When the heating mechanism 16 is put into operation, heat is conducted from the heating mechanism 16 through between the interior flow passages 124 to the outer peripheral surface of the roller body 12. Thus, the base material 91 held on the outer peripheral surface of the roller body 12 under suction is heated.

When the sucking mechanism 17 is put into operation, air in the central flow passage 112 is sucked outwardly to the sucking mechanism 17. This develops a negative pressure (vacuum) in the central flow passage 112, the connecting flow passages 111, the exhaust flow passage 151, the orifice openings 141, the interior flow passages 124 and the suction holes 123. The base material 91 is held on the outer peripheral surface of the suction roller 10 under suction by the negative pressure developed in the suction holes 123.

As shown in FIG. 1, the outer peripheral surface of the suction roller 10 has a closed region 101 covered with the base material 91 and an open region 102 not covered with the base material 91. In the open region 102, because the suction holes 123 are exposed to the outside atmosphere, air enters the interior flow passages 124 through the suction holes 123. In the present preferred embodiment, the orifice openings 141 with a small opening area are interposed between the interior flow passages 124 and the exhaust flow passage 151. The amount of air passing from the interior flow passages 124 to the exhaust flow passage 151 is limited because of the high flow passage resistance of the orifice openings 141. This also suppresses the entry of air from an exterior space into the suction holes 123 to thereby suppress a reduction in the force of suction of the base material 91 in the closed region 101 due to the air entering from the suction holes 123 in the open region 102.

The roller body 12, the orifice plate 14 and the second side plate 15 rotate as a unit. The structure according to the present preferred embodiment suppresses the entry of air from the open region 102 without the slidable movement of members constituting a flow passage for the sucking of the suction roller 10. Thus, the deterioration of the members due to the slidable movement thereof is suppressed. For the slidable movement of the members relative to each other, it is necessary to output power equal to or greater than the sliding resistance from the motor 70. The use of the structure according to the present preferred embodiment, however, achieves a reduction in the power of the motor 70 because of the low sliding resistance of the suction roller 10 during the rotation.

If the inner diameter of the orifice openings 141 is too small, the sucking force of the sucking mechanism 17 is not sufficiently transmitted to the suction holes 123. On the other hand, if the inner diameter of the orifice openings 141 is too large, the entry of air from the open region 102 is prone to occur. It is difficult to sufficiently attract the base material 91 by suction in the closed region 101, whether the inner diameter of the orifice openings 141 is too small or too large. It is hence preferable that the inner diameter of the orifice openings 141 is set to an appropriate size. For example, the inner diameter of the orifice openings 141 is preferably in the range of 0.1 to 3.0 mm, and more preferably in the range of 0.5 to 1.5 mm.

The orifice plate 14 according to the present preferred embodiment is attachable to and detachable from the roller body 12. Thus, the orifice plate 14 is replaceable depending on the processing conditions of the base material 91. This allows the orifice plate 14 including the orifice openings 141 having an optimum opening area to be used for each processing condition of the base material 91.

In the present preferred embodiment, the exhaust flow passage 151 in the second side plate 15 is in communication with a downstream flow passage through the central flow passage 112 provided in coaxial relation to the axis A. This provides a smaller sliding area between the suction roller 10 and the members constituting the downstream flow passage. As a result, the sliding resistance during the rotation is further reduced.

In the case where the heating mechanism 16 is provided inside the roller body 12 as in the present preferred embodiment, it is preferable that the orifice plate 14 is made of resin having a lower thermal conductivity than metal. An example of the resin used herein may include Teflon® excellent in heat-insulating properties. The orifice plate 14 made of such resin suppresses the transfer of heat generated from the heating mechanism 16 to the outside of the orifice plate 14.

<2. Exemplary Application of Suction Roller>

The suction roller 10 may be used, for example, in a manufacturing apparatus that forms an electrode layer on a surface of an elongated strip-shaped electrolyte membrane to manufacture a membrane electrode assembly for a polymer electrolyte fuel cell. In the manufacturing apparatus, the suction roller 10 rotates while holding the electrolyte membrane that is the elongated strip-shaped base material 91 thereon under suction. The manufacturing apparatus includes a coating apparatus including the suction roller 10 and an application part, and a drying mechanism.

The application part includes a nozzle 31 (with reference to FIG. 1) for applying an electrode material to the surface of the electrolyte membrane held on the suction roller 10 under suction. A catalyst ink obtained by dispersing catalyst particles containing platinum (Pt) in a solvent such as alcohol, for example, is used as the electrode material. The nozzle 31 has an ejection orifice in the form of a slit opposed to the outer peripheral surface of the suction roller 10. When the manufacturing apparatus is in operation, the electrode material is ejected from the nozzle 31 toward the surface of the electrolyte membrane rotating in conjunction with the suction roller 10. The nozzle 31 may eject the electrode material either intermittently or continuously.

The drying mechanism is a mechanism for drying the electrode material applied to the surface of the electrolyte membrane. The aforementioned heating mechanism 16 in the suction roller 10 is used, for example, as the drying mechanism. In that case, the {a} solvent in the electrode material is evaporated by heat from the heating mechanism 16. This dries the electrode material to form an electrode layer on the surface of the electrolyte membrane. The drying mechanism may be a mechanism that blows a heated gas toward the electrolyte membrane held on the suction roller 10 under suction.

For example, a fluorine-based or hydrocarbon-based polymer electrolyte membrane is used as the electrolyte membrane. Specific examples of the electrolyte membrane used herein include polymer electrolyte membranes containing perfluorocarbon sulfonic acid (e.g., Nafion® available from DuPont, USA; Flemion® available from Asahi Glass Co., Ltd.; Aciplex® available from Asahi Kasei Corporation; and Goreselect® available from W. L. Gore & Associates, Inc.). The electrolyte membrane has a thickness in the range of 5 to 30 μm, for example. The electrolyte membrane swells when exposed to moisture in the atmosphere, and shrinks when the humidity of the atmosphere is decreased. That is, the electrolyte membrane has the property of being easily deformable depending on the humidity of the atmosphere.

Such an electrolyte membrane, which breaks when placed in an excessively high tension, is required to be transported under a low tension. For the transport of the electrolyte membrane, it is hence necessary to use a driving roller that rotates actively under power of the motor 70 while holding the electrolyte membrane thereon under suction, rather than a free roller that is driven to rotate by tension. In this regard, the suction roller 10 according to the present preferred embodiment is capable of suppressing the entry of air from the open region 102 by means of a structure having a smaller sliding area between the members, as mentioned above. Thus, the suction roller 10 is capable of suppressing the sliding resistance when being driven to reduce the power of the motor 70.

<3. Modifications>

While the one preferred embodiment according to the present invention has been described hereinabove, the present invention is not limited to the aforementioned preferred embodiment.

The roller body 12 according to the aforementioned preferred embodiment is comprised of two members: the inner cylindrical member 121 and the outer cylindrical member 122. The roller body 12, however, may be comprised of a single member or not less than three members. Also, another member such as a sealing member may be interposed between the members constituting the suction roller 10.

In the aforementioned preferred embodiment, the suction holes 123 are formed in the outer peripheral surface of the outer cylindrical member 122 made of metal. Instead, the outermost peripheral portion of the roller body 12 may be made of a porous material such as porous carbon and porous ceramics. Microscopic pores in the porous material may be used as the suction holes 123. Specific examples of the porous ceramics include sintered bodies of alumina ($Al_2O_3$) and silicon carbide (SiC). In this case, it is only necessary that the interior flow passages 124 are provided inside a cylindrical member formed by the porous material.

In the aforementioned preferred embodiment, the base material 91 is directly held on the outer peripheral surface of the suction roller 10 under suction. However, a porous base material having a large number of microscopic pores may be interposed between the outer peripheral surface of the suction roller 10 and the base material 91. That is, the base material 91 may be indirectly held on the outer peripheral surface of the suction roller 10 under suction, with the porous base material therebetween. In such a structure, there is no direct contact between the outer peripheral surface of the suction roller 10 and the base material 91. This prevents particles generated from the base material 91 from adhering to the outer peripheral surface of the suction roller 10, and prevents particles from being transferred from the outer peripheral surface of the suction roller 10 to the base material 91.

In the aforementioned preferred embodiment, the orifice openings 141 are provided, one for each of the interior flow passages 124. Instead, the orifice openings 141 may be provided, one for every two or more interior flow passages 124. However, the provision of the orifice openings 141 one for each of the interior flow passages 124 achieves a smaller opening area of the individual orifice openings 141. This further suppresses the passage of a gas through the orifice openings 141.

The electrolyte membrane is taken as an example of the base material 91 transported by the suction roller 10 in the aforementioned preferred embodiment. However, the "strip-shaped base material" according to the present invention is not limited to the electrolyte membrane. The suction roller according to the present invention may be a suction roller for holding metal foil for lithium-ion batteries or printing paper thereon.

The suction roller 10 may be a suction roller for holding the base material 91 thereon for purposes of applying a material to the base material 91 and drying the material as in the aforementioned exemplary application or may be a suction roller for holding the base material thereon for purposes of performing other processes on the base material. Also, the suction roller 10 may be what is called a tension cut roller which is disposed in a location where tension is to be changed when the base material 91 is desired to be placed under tension with different strengths between upstream and downstream portions of the base material 91 along the transport path.

The configuration of the details of the suction roller may differ from that shown in the figures of the present invention. The components described in the aforementioned preferred embodiment and in the modifications may be combined together, as appropriate, without inconsistencies.

While the invention has been described in detail, the foregoing description is in all aspects illustrative and not restrictive. It is understood that numerous other modifications and variations can be devised without departing from the scope of the invention.

What is claimed is:

1. A suction roller rotating while holding a strip-shaped base material on part of an outer peripheral surface thereof under suction, comprising:
   a cylindrical roller body having said outer peripheral surface and an axis;
   a disk-shaped orifice plate fixed to an end surface of said roller body as seen in a direction of said axis; and
   a disk-shaped side plate fixed to an opposite side surface of said orifice plate from said roller body,
   said roller body including:
   an inner cylindrical member,
   an outer cylindrical member fixed to an outer peripheral surface of said inner cylindrical member,
   a plurality of suction holes provided in said outer peripheral surface, said outer peripheral surface being an outer peripheral surface of said outer cylindrical member, and
   at least one interior flow passage provided to said outer cylindrical member and inside said outer peripheral surface and in fluid communication with said plurality of suction holes,
   said orifice plate including:
   a plurality of orifice openings penetrating said orifice plate, in fluid communication with said at least one interior flow passage, and arranged in a circumferential direction of said orifice plate,
   said side plate including:
   an exhaust flow passage provided inside said side plate and in fluid communication with said plurality of orifice openings,
   said exhaust flow passage being in communication with a central flow passage and said central flow passage being connected to a sucking mechanism,
   at least one orifice opening of said plurality of orifice openings being smaller than said at least one interior flow passage and said exhaust flow passage as seen in the direction of said axis,
   the suction roller further comprising:

a shaft having said central flow passage extending along said axis; and a motor connected to an end portion of the shaft, said motor rotating said roller body, said orifice plate, said side plate, and said shaft as a unit about said axis.

2. The suction roller according to claim 1, wherein:

said at least one interior flow passage includes a plurality of interior flow passages;

said interior flow passages are arranged in spaced-apart relation about said axis; and each of said interior flow passages extends in the direction of said axis.

3. The suction roller according to claim 2, wherein said plurality of orifice openings are in fluid communication with respective interior flow passages of said plurality of interior flow passages.

4. The suction roller according to claim 2, further comprising a heater provided inside said plurality of interior flow passages of said roller body.

5. The suction roller according to claim 4, wherein said orifice plate is made of resin.

6. The suction roller according to claim 3, further comprising a heater provided inside said interior flow passages of said roller body.

7. The suction roller according to claim 6, wherein said orifice plate is made of resin.

8. The suction roller according to claim 1, wherein each orifice opening of said plurality of orifice openings has an inner diameter in the range of 0.1 to 3.0 mm.

9. The suction roller according to claim 1, wherein said orifice plate is attachable to and detachable from said roller body.

10. A coating apparatus comprising:

a suction roller according to claim 1; and an application part for applying a material to a surface of the base material held on said suction roller under suction.

11. An apparatus for manufacturing a membrane electrode assembly, comprising:

a coating apparatus according to claim 10; and a drying mechanism for drying the material applied to the surface of the base material, said base material including an electrolyte membrane, said material including an electrode material.

* * * * *